Oct. 23, 1956      J. E. FEUCHT      2,767,957

ROCK DRILL FRONT END

Filed Feb. 9, 1955

*INVENTOR.*
JACOB E. FEUCHT
BY
ATTORNEY

United States Patent Office 2,767,957
Patented Oct. 23, 1956

2,767,957

ROCK DRILL FRONT END

Jacob E. Feucht, Garfields Heights, Ohio, assignor to Cleveland Rock Drill Division, Westinghouse Air Brake Company, Pittsburgh, Pa., a corporation of Pennsylvania Application February 9, 1955, Serial No. 487,079

2 Claims. (Cl. 255—38)

The invention relates broadly to rock drills of the percussive type, but more particularly to an improved front end construction therefor.

One object of this invention is to produce a rock drill front end assembly comprising a minimum number of parts for transmitting impacts as well as rotary motion to the drill steel.

Another object of this invention is to produce such front end assembly with parts which can be readily manufactured at minimum cost.

Another object of this invention is to produce an improved front end design wherein the drill steel chuck may be installed into or removed from the front housing without disturbing other parts of the assembly.

Other objects will be in part obvious and in part pointed out herein after.

Figure 1:
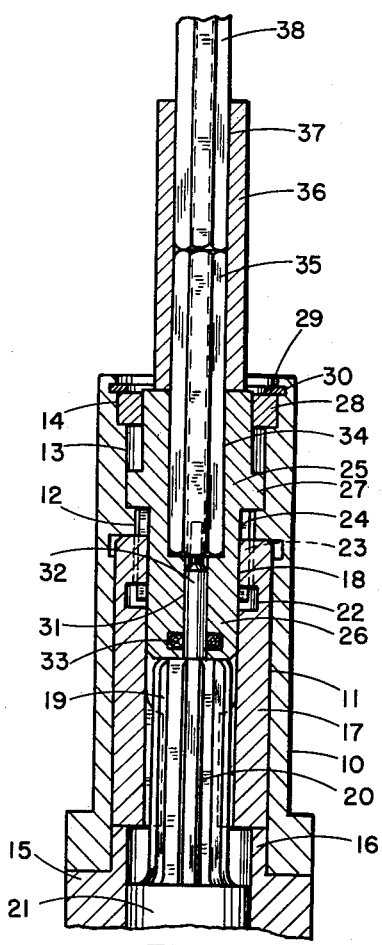
Fig. 1 is a longitudinal sectional view of an improved rock drill front end embodying the invention.

Referring to the drawing and more particularly to Fig. 1, 10 represents a front or chuck housing secured to the front end of the rock drill cylinder 15 by any suitable means such as bolts, not shown. This housing is provided with a relatively large cylindrical flat bottom bore 11 extending forwardly from its rear end with the bottom of the bore defined by an annular internal shoulder 12. On the other side of this shoulder, the housing is also provided with another coaxial bore 13 terminating at its free end into a counterbore 14.

Front housing 10 is axially aligned on cylinder 15 by a pilot portion 16 extending from the cylinder into the rear end portion of bore 11. Between this pilot and the annular shoulder 12, there is rotatably mounted within the bore 11 a chuck sleeve 17. This sleeve has a bore 18 extending centrally therethrough with its portion adjacent the pilot 16 formed with longitudinally extending and peripherally spaced splines 19, which are in sliding engagement with the corresponding splines of a piston stem 20, the piston 21 of which is reciprocally mounted within the cylinder 15. Adjacent its front end, sleeve 17 is provided with an annular groove 22. Leading from this groove to the front end of the sleeve are straight and peripherally spaced splines 23 which are in mesh with corresponding splines 24 formed on a chuck member 25. This chuck has a rear end or block portion 26 slidably mounted within the front portion of chuck sleeve 17. Intermediate its ends, this chuck is provided with an external annular shoulder 27 slidable within the bore 13 of the chuck housing 10 and adapted to engage the annular shoulder 12 of the housing 10 to limit its endwise movement into chuck sleeve 17. Endwise movement of the chuck in the other direction is limited by engagement of its annular shoulder 27 with a chuck bushing 28 fitted within counterbore 14 and retained therein by a split ring 29 mounted within an annular recess 30. Preferably the block end of chuck 25 is provided with a central passage 31 adapted to receive the end portion of a tube 32 sealed in the block by an annular packing 33. This tube extends through the rock drill and piston 21 for supplying either compressed air or water to the drill steel for cleaning the drilled hole.

In the construction shown in Fig. 1, chuck 25 is provided with a centrally extending socket 34 which opens through its front end and is made of polygonal cross section. In this socket is slidably fitted a correspondingly shaped shank member 35, which projects beyond the front end of housing 10 and has slidably mounted thereon one half length portion of a sleeve coupler 36. This coupler is also polygonally shaped internally to fit closely on the shank member against rotation relative thereto with one end abutting the front end of chuck 25. The other half length of coupler 36 forms a polygonal socket 37, similar to socket 34, and adapted to receive one end of a drill steel or tool implement 38.

Figure 2:
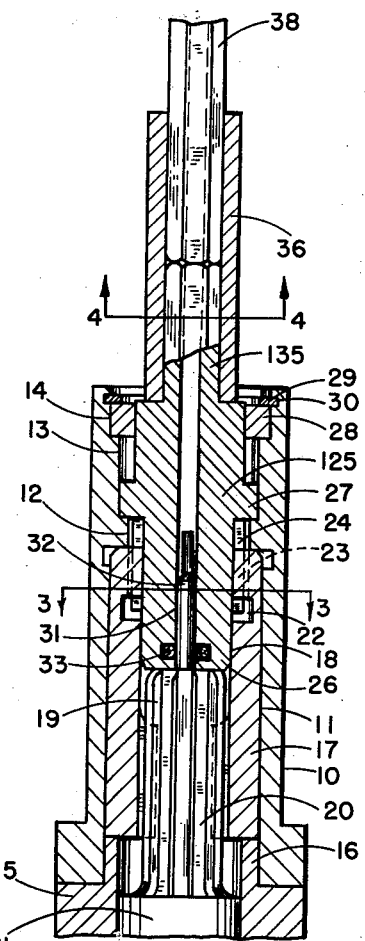
Fig. 2 is a view similar to Fig. 1, but illustrating a modified construction.
Figure 3:
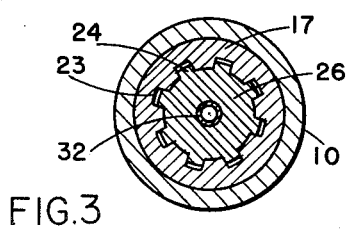
Fig. 3 is a cross sectional view taken on line 3—3 in Fig. 2.
Figure 4:
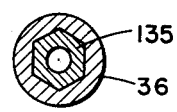
Fig. 4 is a cross sectional view taken on line 4—4 in Fig. 2.

In the modified construction shown in Fig. 2, the chuck member 125 is provided with a shank portion 135 made as an integral part of the chuck, which shank portion projects beyond the front end of housing 10, and has fitted thereon the sleeve coupler 36 in the same manner and for the same purpose as the shank member of Fig. 1.

In the operation of the device, impacts from the hammer piston 21 are delivered to the block end 26 of the chuck member 25 and therefrom to the shank member 35 and drill steel 38. Concurrently rotation of the hammer piston 21 is transmitted to the chuck sleeve 17 through the interengagement of the splines 19 with the corresponding splines of the piston, and from the chuck sleeve to the chuck member 25 through the interengaging splines 23 and 24. From chuck member 25 in Fig. 1, rotation is transmitted to drill steel 38 through polygonal socket 34, shank member 35 and coupler 36, while in the construction shown in Fig. 2, rotation from chuck member 125 is transmitted from its integral shank 135 to the drill steel 38 through coupler 36. Similarly, impacts from chuck 125 are directly transmitted to the drill steel through the chuck shank 136.

As clearly shown in the drawings, the chuck member 25 as well as 125 have both their extreme end portions slidably guided within housing 10, thereby entirely eliminating binding of the chucks within their housings by side loads to which they are subjected. Furthermore, the front end bearing or chuck bushing 28, which is subjected to more wear than the rear end one, is made removable by the simple withdrawal of the split spring ring 29 from its groove 30.

From the foregoing description, it will be understood that the invention provides for a simple and efficient assembly of a drill steel chuck within its housing. An important feature of this invention resides in the design enabling the chuck to be removed from or installed into the chuck housing 10 without having to disassemble the housing from the rock drill cylinder 15. In addition to its function as a front end bearing for the chuck, the bushing 28 also serves as an annular shoulder for housing 10 to check forward endwise movement of the chuck, while its rearward movement is checked by the annular shoulder 12 of housing 10.

With reference to the connection between the chuck and drill steel 38, it is to be understood that the two designs shown in Figs. 1 and 2 are primarily intended for drilling upward holes. In such instance the coupler 38 by its own weight will simply remain seated on the front end of the chuck. In practice, the external diameter of the sleeve coupler 36 is made smaller than the diameter of the hole being drilled, thereby enabling the coupler to penetrate into the drilled hole until the front end of the chuck housing 10 contacts the face of the rock being drilled. This construction enables the drilling of somewhat deeper holes than heretofore possible for a given length of drill steel. In the customary designs, the end portion of the drill steel was made to fit into the socket 34 of the chuck 25, which is of a depth varying between three to seven inches, thus causing the drill steel to be "swallowed" by the chuck or reduced in useful drilling length to that extent. In the present construction, since the drill steel rests on the end of the shank member 35 or 135, it can be used to its full length without any loss for the portion thereof heretofore fitting into the socket corresponding to socket 35. When the drill steel is to be changed, the sleeve coupler 36 is slid on the drill steel until it clears shank 35 or 135 to enable the rock drill, together with its chuck housing 10, to be moved laterally to permit removal of the drill steel from the drilled hole. When the subsequent drill steel has been inserted into the hole, sleeve 36 is slipped on its lower end and then lowered over the shank 35 or 135 to again operatively couple the drill steel to the rock drill.

I claim:

1. In a rock drill, a chuck housing, a piston reciprocable and rotatable in said housing, a chuck sleeve axially retained in said housing and in spline engagement with said piston for rotation therewith, a drill steel chuck having a block end slidable within said sleeve adapted to receive impacts from said piston and a socket end adapted to receive the shank of a tool implement, interengaging means between said sleeve and chuck preventing relative rotation therebetween, an external shoulder on said chuck, a first internal shoulder on said housing engaged on one side by said sleeve and on the other by said external shoulder to limit endwise movement of said sleeve and chuck toward one another, and a second internal shoulder on said housing longitudinally spaced from the first one and engageable by said external shoulder to limit endwise movement of said chuck away from said sleeve.

2. In a rock drill, a chuck housing, a piston reciprocable and rotatable in said housing, a chuck sleeve in said housing of uniform external diameter throughout its length, means in said housing engageable with one end of said sleeve to retain it axially in one direction, a drill chuck having a block end slidable within said sleeve adapted to receive impacts from said piston, interengaging means between said sleeve and chuck preventing relative rotation therebetween, a first internal shoulder integral with said housing engaged by the other end of said chuck sleeve to retain it axially in the other direction, a second internal shoulder on said housing axially spaced from said first one, and an external shoulder on said chuck engageable with said internal shoulders to limit endwise movement of said chuck.

References Cited in the file of this patent

UNITED STATES PATENTS

| | | |
|---|---|---|
| 258,100 | Moreau | May 16, 1882 |
| 2,458,289 | Morrison | Jan. 4, 1949 |
| 2,597,574 | Dickenson | May 20, 1952 |

FOREIGN PATENTS

| | | |
|---|---|---|
| 690,531 | Great Britain | Apr. 22, 1953 |